United States Patent [19]

Fraser

[11] 4,367,439

[45] Jan. 4, 1983

[54] AIRBORNE GEOPHYSICAL SURVEYING SYSTEM USING MULTIPLE COIL PAIRS

[76] Inventor: Douglas C. Fraser, Ste. 4900, Toronto-Dominion Centre, Toronto, Canada, M5K 1E8

[21] Appl. No.: 129,347

[22] Filed: Mar. 11, 1980

[30] Foreign Application Priority Data

Mar. 13, 1979 [CA] Canada ................................. 323304

[51] Int. Cl.³ ..................... G01V 3/165; G01V 3/10
[52] U.S. Cl. ..................................... 324/330; 324/335
[58] Field of Search ................ 324/329, 330, 335, 334

[56] References Cited

U.S. PATENT DOCUMENTS

| | | | |
|---|---|---|---|
| 2,623,924 | 12/1952 | Cartier et al. | 324/335 X |
| 2,642,477 | 6/1953 | Puranen et al. | 324/330 X |
| 2,929,984 | 3/1960 | Puranen et al. | 324/335 |
| 2,931,973 | 4/1960 | Puranen | 324/334 |
| 2,955,250 | 10/1960 | Shaw et al. | 324/335 X |
| 2,955,251 | 10/1960 | Shaw et al. | 324/335 X |
| 2,995,699 | 8/1961 | Snelling et al. | 324/335 X |
| 3,617,866 | 11/1971 | Dowsett et al. | 324/334 |

FOREIGN PATENT DOCUMENTS

| | | | |
|---|---|---|---|
| 680143 | 2/1964 | Canada | 324/330 |
| 648928 | 2/1979 | U.S.S.R. | 324/343 |

OTHER PUBLICATIONS

Andrieux et al., *Electromagnetic Soundings on Coastal Permafrost Geophysics*, vol. 41; No. 2, Apr. 1976, p. 338.

*Primary Examiner*—Gerard R. Strecker

[57] ABSTRACT

The secondary signals induced in the receiver coils of two or three transmitter-receiver coil-pairs flown over terrain to be surveyed are combined to provide additional data relating to the terrain. One of the coil-pairs is arranged in a whaletail configuration, and the other or others in standard and/or fishtail configurations. The inphase and/or quadrature secondary whaletail and standard or fishtail signals are combined in such a manner as to cancel responses due to conductive overburden and distributed magnetite, and the whaletail and standard (or fishtail) signals are compared to differentiate anomalies caused by thin and thick steeply dipping conductive layers.

4 Claims, 11 Drawing Figures

| COIL | NOMENCLATURE |
|---|---|
| # 1 | STANDARD |
| # 2 | WHALE TAIL |
| # 3 | FISH TAIL |

| COIL | NOMENCLATURE |
|---|---|
| # 1 | STANDARD |
| # 2 | WHALE TAIL |
| # 3 | FISH TAIL |

(a) STANDARD INPHASE (b) WHALE TAIL INPHASE (a) STANDARD INPHASE (b) WHALE TAIL INPHASE

AIRBORNE GEOPHYSICAL SURVEYING SYSTEM USING MULTIPLE COIL PAIRS

The present invention relates to geophysical surveying and, more particularly, to methods and apparatus for conducting electromagnetic (EM) geophysical surveys.

The general principles of EM surveying to explore for electrically conductive ore bodies have become well known in the art. For instance, the theory and practice of this art is discussed in Grant and West "Interpretation Theory in Applied Geophysics" McGraw-Hill, New Yok 1965.

Canadian Pat. No. 911,526, issued Oct. 3, 1972 to J. S. Dowsett and R. O. Leask, discloses apparatus and method seeking to improve upon the prior art in various respects discussed in the specification of that patent.

Even with the improvements disclosed in the above patent, there are several problems in airborne EM surveying systems which are not believed to have been solved successfully, among which are the following:

(1) It is not possible to obtain an indication of the width of a steeply dipping bedrock conductor. Previously constructed airborne EM systems cannot differentiate a broad anomaly produced by a wide body from a similar anomaly produced by several closely-spaced thinners bodies.

(2) The presence of conductive overburden diminishes the ability of an airborne system to effectively explore the bedrock beneath, even in cases where a bedrock conductor is energized. This is because a high degree of activity on the EM channels reduces the likelihood of recognizing that a particular EM anomaly might be caused by a bedrock conductor. This problem is inherent to all previously constructed airborn EM systems.

(3) The inphase received signal is affected by the presence of magnetite. When magnetite is widely distributed in a survey area, the inphase channels may continuously rise and fall reflecting variations in the magnetite percentage, flying height and overburden thickness. This can lead to difficulties in recognizing bedrock conductors. This problem is inherent to all previously constructed airborne EM systems which measure an inphase component.

Accordingly, the invention provides a method of geophysical surveying, comprising supplying alternating current at comparable but different frequencies to at least two orthogonally disposed transmitter coils, acquiring separate channels of data relating to secondary current induced at said different frequencies in at least two orthogonally disposed receiver coils rigidly spaced from said transmitter coils whilst flying said coils over terrain to be surveyed and processing said data to obtain records indicating the difference between the data acquired from a pair of transmitter and receiver coils operating at one frequency and that from a pair operating at a different frequency.

Preferably the coils of one of said pairs are arranged in a whaletail configuration, i.e. with the coil axes vertical, and the coils of a second one of said pairs of coils are preferably arranged in standard configuration, i.e. with the coils on a common horizontal axis.

The records may be produced by plotting the records side by side for visual comparison, or be appropriate combination of the signals before plotting. In this latter case, half the response from a whaletail configuration coil-pair operating at one frequency is preferably subtracted from the response from a standard or fishtail (i.e. with the coils in a common plane with their axes horizontal and parallel) pair, since as will be demonstrated this acts to cancel responses due to conductive overburden without suppressing responses due to buried ore bodies. This cancellation is achieved both for the inphase and quadrature components of the secondary signal. A similar cancellation effect is also achieved in respect of responses due to broadly distributed magnetite in the ground being surveyed. Moreover, the response obtained from a whaletail coil-pair as it is moved over the top of a thin and steeply dipping conductive dike, or a group of such dikes, is found to have a characteristic double peaked configuration with a central valley in which the response tends towards zero, while the standard and fishtail configurations provide a single centrally peaked response. A thick conductive body on the other hand will produce a single peaked response with all three configurations. Comparison of the response from a whaletail pair with that from a pair of either of the other two varieties thus enables identification of anomalies produced by usually worthless groups of thin parallel dikes from ore conductive bodies of substantial thickness which are more likely to repay further investigation.

Other objects and advantages of the invention will become apparent from the following description taken in conjunction with the accompanying drawings in which.

Figure 1:
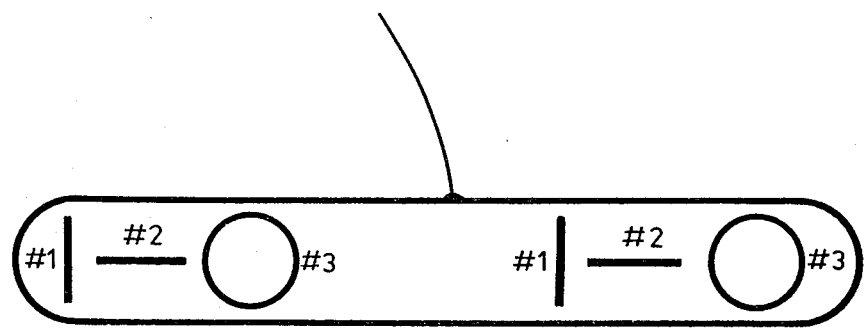
FIG. 1 is a diagrammatic vertical section through an airborne EM coil system having three coil-pairs.

Referring to FIG. 1, an airborne EM coil system is shown in vertical section, containing three orthogonal pairs of coils 1, 2 and 3. These three coil-pairs are shown for the sake of illustration, and in practice good results can be obtained by omitting coil-pair 3 as discussed further below. The construction of tube, coils, and the attachment mountings, are designed in accordance with conventional EM practice to ensure rigidity to reduce to a minimum unwanted signals arising from the movement of one coil relative to another coil. The transmitter coils of each pair are supplied with alternating current, the frequency supplied to each transmitter coil being sufficiently different to enable the responses obtained thereto in the receiver coils to be individually selected, but near enough the same that no significant distortion of the response obtained occurs due to frequency differences.

In FIG. 1, the plane of transmitter coil 2 is horizontal, and it may be termed the whaletail transmitter, and the tube flown in this orientation may be referred to as the whaletail survey mode. The plane of transmitter coil 3 is vertical, and it may be termed the fishtail transmitter, or by rotating the tube 90 degrees about its axis, the horizontal transmitter #2 is rotated into a vertical plane and so may act as a fishtail transmitter. The tube flown in this latter orientation may be referred to as the fishtail survey mode. In each mode, the coils transmit at approximately the same frequency, e.g., within 5% of each other. The frequency separation of 5% is sufficiently large to allow the various received components to be separated by the electronics, but is sufficiently small to allow the two frequencies to be treated as identically equal in the mathematical analysis of the received signals. The underlying purpose of the invention is to analyze the differences of behaviour of a conductor to two or more directions of primary EM field energization. This cannot be accomplished if the various transmitter coils operate at significantly different frequencies because the response of a conductor is frequency-dependent as well as geometry-dependent.

For the whaletail mode of flying, geometric information is obtained by comparing the response of the whaletail coil-pair to the standard coil-pair, i.e., the technique involves the comparison of the inphase and quadrature amplitudes of whaletail and standard coil-pairs. The responses of five conductor models are discussed below. The amplitude ratios of the responses are controlled by the shape of the conductor, as is discussed below.

The first three models for different forms of horizontal layering are of importance mainly in relation to conductive overburden responses. These models all yield whaletail/standard response amplitude ratios of approximately 2 (in terms of secondary EM field strength at the receiver coils) for both inphase and quadrature components of the received signal. This suggests that the ratio will always be approximately 2 for any combination of horizontal layering in conductive overburden, and survey experience shows this to be true. The constancy of this ratio means that overburden responses are clearly recognizable. Also, such responses are largely removable by signal processing, merely by dividing the response from the whaletail coil-pair by 2 and subtracting it from that of the standard coil-pair.

Two additional models (sphere and steeply dipping dike) are characteristic of bedrock conductors. They yield significantly different amplitude ratios.

Figure 3:
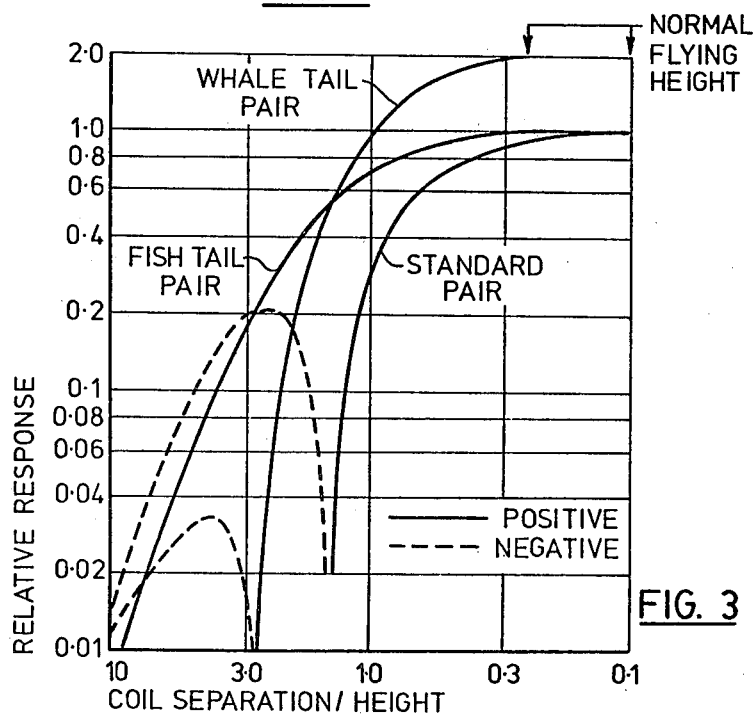
FIG. 3 is a graph comparing the amplitude of the secondary signals generated by a horizontal conductive sheet in the receiving coil of whaletail, standard and fishtail coil-pairs, respectively.

The horizontal conductive sheet is a suitable model for a thin layer of conductive overburden. As will be seen from FIG. 3, the responses of whaletail on the one hand and standard and fishtail coil-pairs on the other hand are different at the inductive limit. The response of the whaletail pair is twice that of the standard or fishtail pair for normal flying heights. Therefore, the ratio of the response amplitude W of the whaletail pair to that S of the standard coil-pair is W/S 2.

The conductive earth model is suitable for uniform resistivities such as might occur for a thick layer of conductive overburden. The inphase and quadrature signals for this model for the two coil-pairs may be calculated from tabulated data for different flying heights and induction numbers and it is again found that W/S is close to 2. This ratio is valid for both inphase and quadrature components. The ratio is approximately independent of the flying height and the frequency of the system, and of the conductivity of the conductive earth. The ratio is exactly 2.0 for infinite conductivity and a high flying height because the conductive earth and horizontal sheet must provide identical responses at the inductive limit.

The two-layer earth model is suitable for modelling conductive overburden overlying homogeneous resistive or conductive rocks, or for two layers of overburden of differing conductivity where the thickness of the lower layer exceeds the depth of penetration. The inphase and quadrature signals from this model for the two coil-pairs may be calculated from published test figures for a wide range of induction numbers of the two layers, for different flying heights, for different ratios of lower layer conductivity to upper layer conductivity, and for different thicknesses of the upper layer, and the ratio W/S is again found closely to approximate to 2, for both inphase and quadrature components. The ratio is approximately independent of the flying height and frequency of the system, and of the conductivity and thickness of the upper layer, and of the conductivity of the lower layer.

Published test results also indicate that for a conductive sphere, useful as a model for a massive ore body, the W/S ratio varies from 3.0 to 4.6 for a range of flying heights, ratios of spherical radii to flying height, and induction numbers. This ratio range is valid for both inphase and quadrature components.

Data are not available in the literature for the response of the whaletail coil-pair to a steeply dipping dike, but can be obtained from model studies. FIGS. 4A to 4D show a comparison of the inphase responses of the standard coil-pair and the whaletail pair for vertical thin and thick dikes. The center of the whaletail response (FIG. 4C) is zero over the thin dike. The absence of a flat top, or thickness, for this conductor is clearly indicated by the central zero response for the whaletail coil-pair. In contrast, the whaletail anomaly becomes strongly positive for thick conductors (FIG. 4D). The anomaly shape for a dipping thin dike is similar to that of FIG. 4C, except that the down-dip shoulder is larger and the up-dip shoulder smaller. The peak of the standard anomaly coincides with the trough of the whaletail anomaly for a dipping or vertical thin dike, so the lack of thickness is clearly evident.

The volcano-sedimentary belts of the Canadian Precambrian Shield are characterized by steeply dipping strata. The majority of conductors in this environment are comformable and, consequently, the steeply dipping thin dike is usually the model of choice. Surveys normally are designed to cross the conductors at right angles. The great majority of barren sulfide conductors in the Precambrian environment which have been drilled appear to have thicknesses of less than 3 m. This contrasts sharply with economic conductors which generally have thicknesses greater than 15 m, e.g., Magusi River and New Insco near Noranda, Quebec, and Mattabi near Sturgeon Lake, Ontario. The differing genesis of barren sulfides and economic sulfides often appears to manifest itself in thickness as well as in mineral assemblages. In simplistic terms, sulfides deposited during the andesitic phases of volcano-sedimentary sequences typically are extensive in area, thin, and barren. Conversely, those deposited during the rhyolitic phases typically are restricted in area, are thicker, and often contain valuable metals.

The importance of a thickness parameter for conductor sorting has not been mentioned in the descriptions of other airborne EM systems. This is because thickness and conductivity tend to be inseparable with previously constructed systems. As an example of the problem in determining thickness, inphase anomalies, which are obtained from the standard coil-pair of this present system and all previously constructed airborne EM systems, over thick massive sulfide deposits and deposits consisting of a multiplicity of closely spaced thin conductive sheets are indistinguishable. A multiplicity of thin conductors is far more common than thick massive sulfide conductors, but it is the latter which have far greater economic potential.

FIGS. 4A-4D illustrate that the flat top of a thick conductor can be recognized when using the standard and whaletail coil-pairs together. Such a discrimination between thin and thick conductors has tremendous potential for the recognition of ore targets in a multiconductor environment.

The fishtail transmitter-receiver coil-pair (see FIG. 1) yields anomalies very similar in character to those of the standard coil-pair. In fact, the responses on all comparative channels are identical when the coil-pairs are flown across a vertical thin dike at an angle of 45°, or when it is over a horizontal conductor.

The amplitude ratio of fishtail to standard coil-pairs yields some information on the shape of a conductor, but the fishtail/standard ratio is not nearly as diagnostic as the whaletail/standard ratio. Thus, for example, the thickness of a vertical dike cannot be obtained reliably. The fishtail/standard ratio primarily defines the strike of a steeply dipping conductor.

Figure 5:
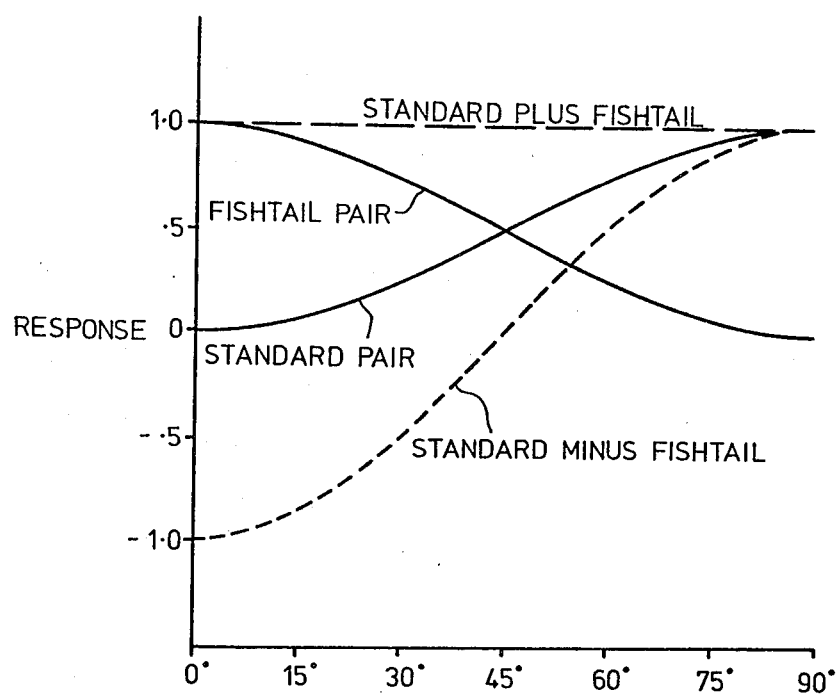
FIG. 5 is a graph comparing the secondary signal amplitudes received from standard and fishtail coil-pairs for a vertical thin dike as a function of the strike angle.

The combination of standard and fishtail coil-pairs couples equally with conductors of any strike, because the strike bias of the standard coil-pair is complemented by that of the fishtail coil-pair. FIG. 5 illustrates the responses of the standard and fishtail coil-pairs to a vertical thin dike as a function of its strike angle. Also shown are the sum and difference for the two coil-pairs. The sum curve would provide a response independent of the strike of a conductor, but contain twice any overburden response which might be present on the standard coil-pair, whereas the difference curve would be essentially free of an overburden response, but provides very little response from conductors at an angle of about 45° to the line of flight.

The survey equipment shown in FIG. 1 can be used as described in either the whaletail survey mode or in the fishtail survey mode, but not both simultaneously unless all three coil pairs 1, 2 and 3 are provided.

The combining of received signals from the two or three maximum-coupled transmitter-receiver coil-pairs of FIG. 1 yields advantages in anomaly recognition through reduction in geologic noise. The term geologic noise refers to unwanted responses such as may be obtained from conductive overburden, host rock, and faults, and from non-conductive magnetically polarizable bodies.

The technique described below is used to generate EM channels which typically display an order-of-magnitude reduction in geologic noise caused by non-discrete (i.e., horizontally broad) sources.

The term conductive ground is used to encompass all sources of non-discrete conductive material, e.g. overburden, layered materials whether consolidated or unconsolidated, or conductive rock. Such material can have resistivities below 10 ohm-m, and can yield very active EM channels as a result of variations in both flying height and conductivity.

For the equipment of FIG. 1, it has been indicated that a division by 2 of the inphase or quadrature secondary signal from the whaletail coil-pair, and then subtraction from the corresponding signal from the standard coil-pair (or any equivalent algebraic manipulation), yields a difference signal which is largely free of overburden response. Thus, overburden can produce a continuously anomalous response on both coil-pairs, due to changes in flying height, overburden thickness and conductivity, and yet the difference signal is approximately zero. Edge effects give small anomalies, but the difference signal nevertheless is free of the majority of overburden responses. Even in the difference signal, steeply dipping thin bedrock conductors still yield strong difference responses, roughly equivalent to the amplitudes obtained directly from the standard coil-pair.

Similarly, for the fishtail mode of survey, a subtraction of the inphase or quadrature response of the fishtail coil-pair, from the inphase or quadrature of the standard coil-pair, yields a difference inphase or quadrature which is largely free of overburden response. The effect is analogous to the overburden substraction discussed above for the whaletail mode, except that a bedrock conductor yields only a weak difference response if the flight line crosses it at an angle between 30 and 60 degrees (FIG. 5).

For the equipment of FIG. 1, a subtraction of the inphase or quadrature of the whaletail coil-pair, from the sum of the inphase or quadrature of the standard-+fishtail coil-pairs, again yields a difference inphase or quadrature which is largely free of overburden response.

A non-conductive magnetically polarizable body such as that provided by broadly distributed magnetite, yields a characteristic negative inphase anomaly, which is a form of geologic noise. The response of a magnetically polarizable half space can be modelled by a surface of magnetic poles. The individual pole strength and sign at each point on the surface are dependent on the strength and orientation of the primary field at that point. Similarly, the response of a non-conductive magnetically polarizable horizontal sheet can be modelled by a surface of dipoles. The individual dipole moment and orientation at each point on the sheet are dependent on the strength and orientation of the primary field at that point. In each case, the following can be readily shown by use of a computer for the numerical integration:

(1) The standard and fishtail coil-pairs both yield the same response.

(2) The whaletail coil-pair provides twice the response of the standard coil-pair.

Consequently, the difference technique, which tends to eliminate the response of conductive overburden, also has the same effect on broadly distributed magnetite.

The advantages of the present invention are described theoretically above. The following survey examples flown in the whaletail mode demonstrate the usefulness of the invention. The invention can yield many channels of information, but of most direct interest are the following six channels, identified by the channel numbers given below in FIGS. 6, 7 and 8.

| channel | description of received secondary signal |
|---|---|
| 22 | inphase of the standard coil-pair |
| 23 | quadrature of the standard coil-pair |
| 24 | inphase of the whaletail coil-pair |
| 25 | quadrature of the whaletail coil-pair |
| 33 | difference inphase = channel 22 − ½ of channel 24 |
| 34 | difference quadrature = channel 23 − ½ of channel 25 |

Figure 4A:
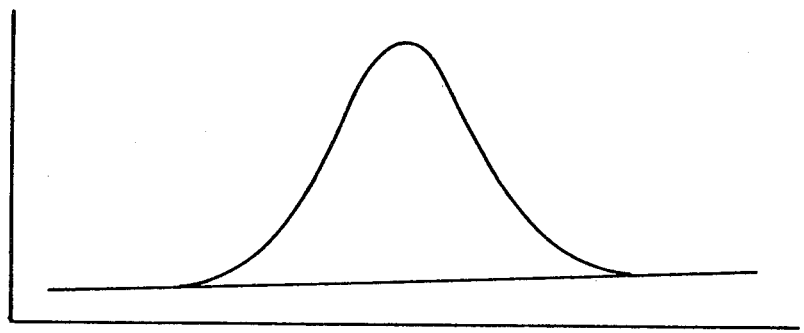
FIGS. 4A, 4B, 4C and 4D are graphs illustrating the anomalies produced in the inphase components of the secondary signals received in standard (4A and 4B) and whaletail (4C and 4D) coil-pairs by vertical thin (4A and 4C) and thick (4B and 4D) dikes respectively.
Figure 4C:
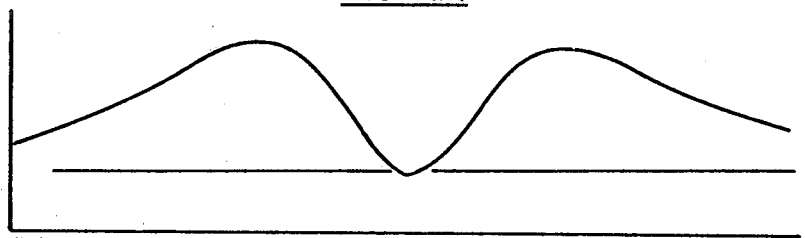
Figure 4B:
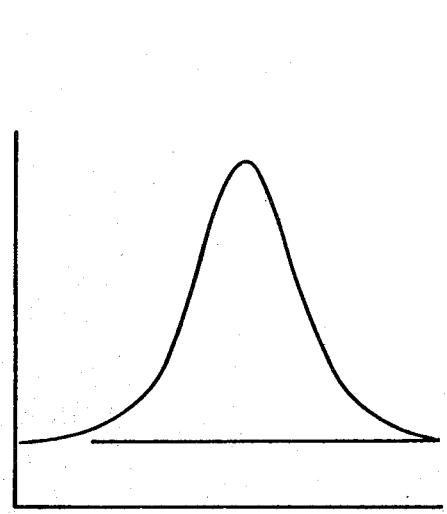
Figure 4D:
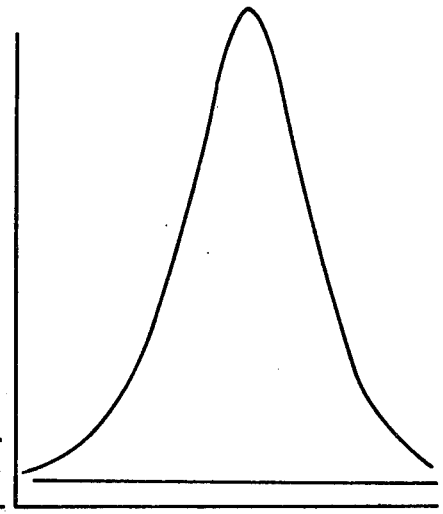
Figure 6:
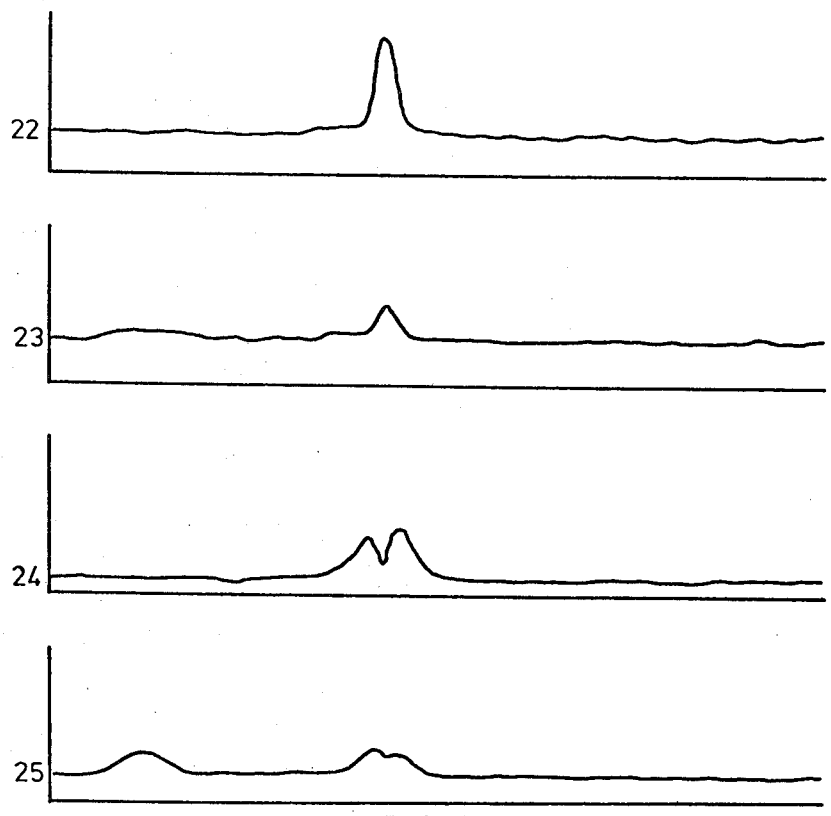
FIG. 6 is a graph plotting the secondary signals obtained from standard and whaletail coil-pair during a flight over a thin barren sulphide zone.

FIG. 6 shows a conductor which can be recognized as thin because channel 24 has a trough which is coincident with the peak of channel 22 (see FIGS. 4A and 4C).

Figure 7:
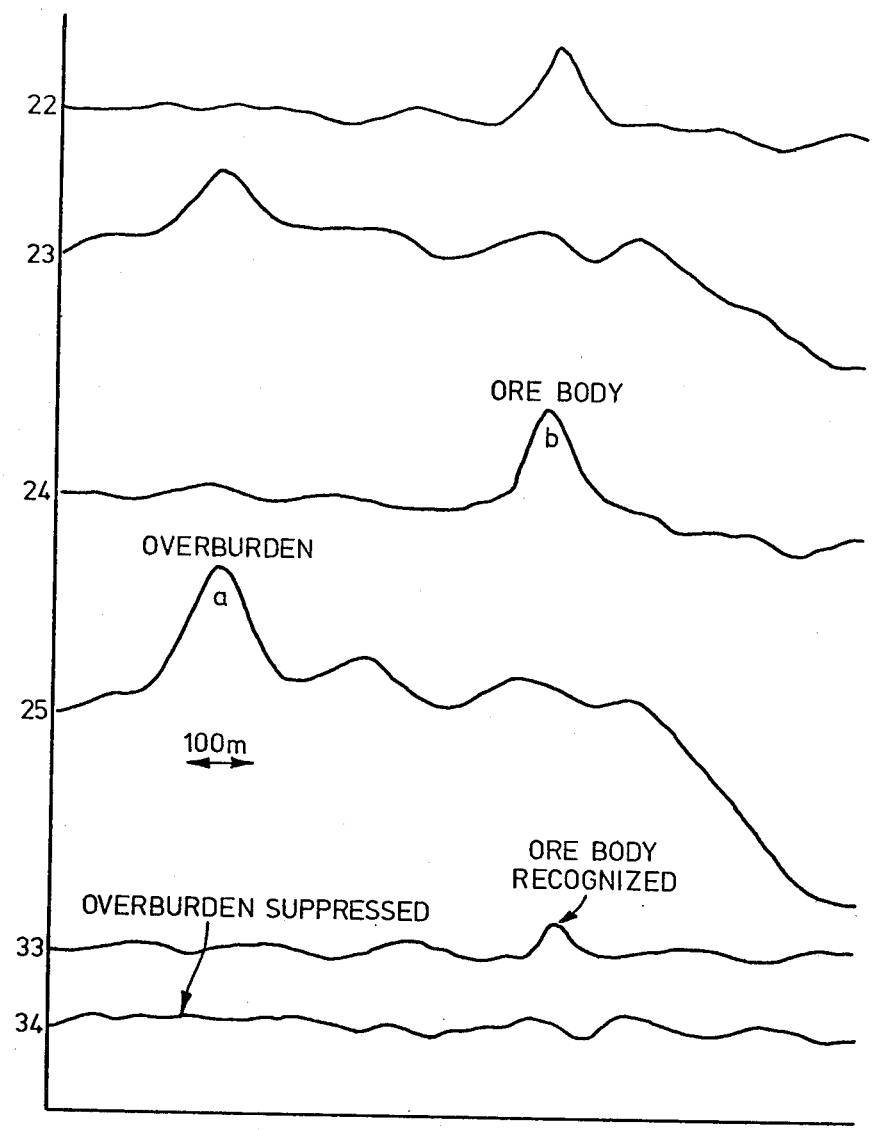
FIG. 7 is a graph plotting the secondary inphase and quadrature signals obtained on a pass over an area of conductive overburden and an ore body, and the suppression of the overburden response and recognition of the ore body response obtained by combining the channels.

FIG. 7 shows two similar anomaly shapes, where a is a conductive swamp and b is a copper-nickel ore body. The difference channels 33 and 34 have no anomaly over the swamp but yield an anomaly over the ore body. This is an extremely significant feature because no previously constructed airborne EM system could show that ground exploration of anomaly a would involve a wasteful expenditure.

The inphase and quadrature difference functions have considerable potential for detecting a conductor whose EM signals are buried in the geologic noise of a highly conductive environment. This potential is indicated by an examination of FIG. 7. The ore body gives a quadrature component which appears to be considerably smaller than that yielded by the conductive overburden (cf. channel 23). However, the ore-related quadrature component on the difference channel 34 is approximately double the residual signal from the overburden. This example shows that the difference channels can provide as mush as an order-of-magnitude increase in the signal/noise ratio for bedrock conductors in some geologically noisy environments.

Figure 8:
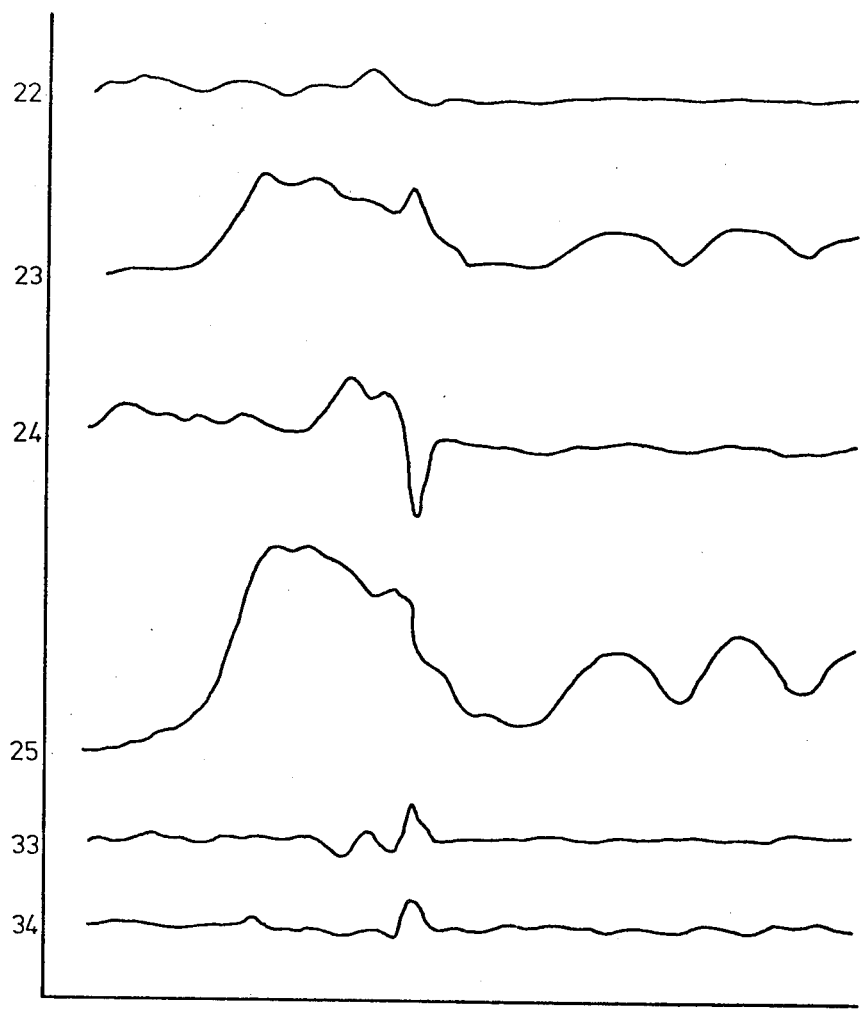
FIG. 8 is a further graph similar to that of FIG. 7, illustrating the suppression of responses due to distributed magnetite.

FIG. 8 shows a case where a conductor could not normally be detected because of the presence of magnetite. The inphase difference channel 33 shows a clear anomaly c, although magnetite has completely suppressed the conductor's response on the recorded inphase channels 22 and 24. The invention has the capability of detecting ore bodies in environments where previously constructed systems could fail.

Figure 2:
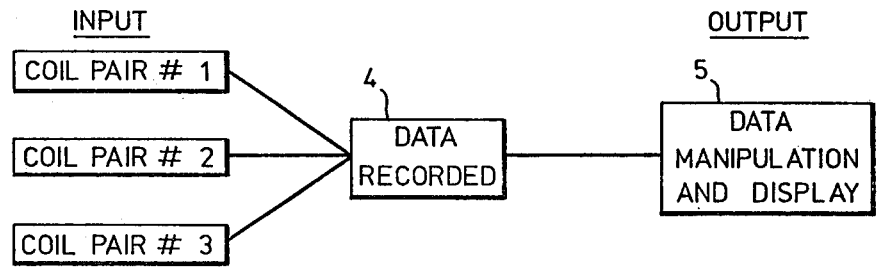
FIG. 2 shows a block diagram of apparatus for carrying out the method of the invention.

The apparatus utilized to implement the method of the invention has not been described in detail except for those features in which it differs from conventional airborne EM equipment. In effect, secondary signal data is recovered simultaneously from two or three mutually orthogonal coil-pairs which in effect constitute separate coil-pair systems operating in parallel. The only difference in normal techniques for transmission and reception are those necessary to ensure that the receivers associated with the receiver coils are sufficiently selective to resolve the signals from the transmitter coils so as to accept those at the frequency of their associated transmitter coil and adequately to reject those from the other transmitter coil or coils. The signals acquired may either be processed further immediately, or recorded for subsequent processing. The further or subsequent processing consists of plotting the various signals acquired from different coil-pairs side by side to show up differential responses to anomalies, and/or combining the signals obtained to provide difference channels, particularly difference channels in which the W/S and W/F response ratios of 2 for conductive overburden and distributed magnetite are exploited to cancel such responses. These techniques are illustrated by FIGS. 6, 7 and 8. The difference channels may be obtained by conventional electrical summing techniques using operational amplifiers, by digital techniques, or by any other known means for summing data in different channels. Suitable techniques will be immediately apparent to those skilled in the art and need not be discussed here, although the system will generally follow the scheme set forth in FIG. 2, in which data recorded by recorder 4 from coil-pairs 1, 2 and 3 is immediately or subsequently processed and displayed in a unit S.

What I claim is:

1. A method of geophysical surveying comprising flying over terrain to be surveyed at least two rigidly spaced transmitter-receiver coil-pairs including a whaletail configuration coil-pair, and at least one of a standard configuration coil pair and a fishtail configuration coil pair, energizing the transmitter coils of said pairs at frequencies which are different but sufficiently closely spaced that differences in responses induced in the receiver coils due to the differences of said frequencies are negligible, isolating at least one of the inphase and the quadrature components of the secondary signals from the terrain induced in said receiver coils by their associated transmitter coils, and plotting a signal proportional to the difference between a component of the response of the whaletail receiver coil and a signal selected from the group consisting of twice the corresponding component of the response of the standard receiver coil, twice the corresponding component of the response of the fishtail receiver coil, and the sum of said response components from the standard and fishtail receiver coils, whereby to obtain a signal substantially free of responses due to conductive overburden and distributed magnetite.

2. A method of geophysical surveying comprising flying over terrain to be surveyed at least two rigidly spaced transmitter-receiver coil-pairs including a whaletail configuration coil pair and a fishtail configuration coil pair, energizing the transmitter coils of said pairs at frequencies which are different but sufficiently closely spaced that differences in responses induced in the receiver coils due to the differences of said frequencies are negligible, isolating at least one of the inphase and the quadrature components of the secondary signals from the terrain induced in said receiver coils by their associated transmitter coils, and comparing a component of the response of the whaletail receiver coil with a corresponding component of the response of the receiver coil of at least one other of the coil pairs, and identifying coincidences of single peaks and of central zeros between double peaks in the component from the whaletail receiver coil with peaks in the at least one other component, whereby to distinguish responses due respectively to thick and to thin steeply dipping conductive layers in the terrain.

3. A method according to claim 2, wherein the inphase components of the responses are compared.

4. A method of geophysical surveying comprising flying over terrain to be surveyed at least two rigidly spaced transmitter-receiver coil-pairs including a standard configuration coil-pair and a fishtail configuration coil-pair, energizing the transmitter coils of said pair at frequencies which are different but sufficiently closely spaced that differences in responses induced in the receiver coils due to the difference of said frequencies are negligible, isolating at least one of the inphase and the quadrature components of the secondary signals from the terrain induced in said receiver coils by their associated transmitter coils, subtracting said signals one from the other to obtain a signal proportional to the difference between corresponding components of the responses from the receiver coils of the two coil pairs whereby to obtain a signal in which responses due to conductive overburden or distributed magnetite are substantially cancelled.

* * * * *